(12) United States Patent
Prasad et al.

(10) Patent No.: US 7,244,799 B2
(45) Date of Patent: Jul. 17, 2007

(54) SILOXANES AND METHODS OF SYNTHESIS THEREOF USING METALLIC NANOPARTICLE CATALYSTS

(75) Inventors: Bhagavatula L. V. Prasad, Pune (IN); Savka Stoeva, Evanston, IL (US); Kenneth J. Klabunde, Manhattan, KS (US); Christopher Sorensen, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 74 days.

(21) Appl. No.: 10/888,165

(22) Filed: Jul. 9, 2004

(65) Prior Publication Data

US 2005/0272897 A1    Dec. 8, 2005

Related U.S. Application Data

(60) Provisional application No. 60/485,682, filed on Jul. 9, 2003.

(51) Int. Cl.
*C08G 77/08* (2006.01)
(52) U.S. Cl. .......................................... 528/14; 528/31
(58) Field of Classification Search ................. 528/14, 528/31
See application file for complete search history.

(56) References Cited

U.S. PATENT DOCUMENTS 3,642,693 A * 2/1972 Jasinski et al. ............... 528/14
3,673,268 A * 6/1972 Schleyer ....................... 585/22
6,562,403 B2   5/2003 Klabunde et al.
2001/0034375 A1* 10/2001 Schwertfeger et al. ........ 516/98
2002/0117659 A1*  8/2002 Lieber et al. .................. 257/14

FOREIGN PATENT DOCUMENTS

KR       2002-095382       * 12/2002

OTHER PUBLICATIONS

Pradsad et al., Chem. Mater. 15(2003) 935-942.*
Gold Nanoparticles as Catalysts for Polymerization of Alkylsilanes to Siloxan Nanowires, Filaments and Tubes; Prasad, Stoeva, Sorensen, Zaikovski & Klabunde; Dept of Chem; Dept of Phys; Kansas State University, Manhattan, Kansas 66502; Boreskov Inst of Catalysis, Novosibirsk 630090, Russia.
B.L.V. Prasad et al; Gold Nanoparticles as Catalysts for Polymerization of Alkylsilanes to Siloxane Nanowires, Filaments, and Tubes; J. Am. Chem. Soc., vol. 125, No. 35; p. 10488; Web Publication date: Aug. 9, 2003.

* cited by examiner

*Primary Examiner*—Kuo-Liang Peng
(74) *Attorney, Agent, or Firm*—Hovey Williams LLP

(57) ABSTRACT

Novel siloxanes are provided in the form of nanoscale bodies having discrete, observable structures, such as elongated wires, tubes, filaments and coils, having a length of at least about 100 nm and a diameter of from about 2-200 nm. The siloxanes are synthesized by reacting a substituted silane in a solvent system comprising water and a polar organic solvent, and in the presence of a metallic nanoparticle catalyst such as gold.

57 Claims, 15 Drawing Sheets

FLOW DIAGRAM OF THE SYNTHETIC STEPS FOR PREPARATION OF SILOXANE NANOWIRES

REACTION MECHANISM

1. Attachment of $RSiH_3$ to the Au nanoparticle surface with loss of hydrogen and formulation of Au-Si bonds.
2. The weak Au-Si bonds are attached by $H_2O$ molecules leading to the formation of $RSi(OH)_x$
3. $RSi(OH)_x$ polymerization

PROBABLE STRUCTURE OF THE SILOXANE WIRES

Chemical composition (from EDAX and elemental analysis) is $C_{18}H_{37}SiO_{1.5}$ with trace amounts of gold.

SEM OF SILOXANE NANOWIRES

SILOXANES AND METHODS OF SYNTHESIS THEREOF USING METALLIC NANOPARTICLE CATALYSTS

CROSS-REFERENCE TO RELATED APPLICATION

This application claims the benefit of Provisional Application Ser. No. 60/485,682, filed Jul. 9, 2003. This Provisional Application is incorporated by reference herein.

FEDERALLY SPONSORED RESEARCH/DEVELOPMENT PROGRAM

This invention was made with Government support under contract NAG8-1687 from the National Aeronautics and Space Administration and DMR0234686 from the National Science Foundation. The Government has certain rights in the invention.

BACKGROUND OF THE INVENTION

1. Field of the Invention

The present invention is broadly concerned with new siloxane bodies having unique nanoscale morphologies. More particularly, it is concerned with such siloxanes, which may be in the form of elongated wires, tubes, filaments or coils, as well as methods of synthesis thereof using nanoparticle metal catalysts.

2. Description of the Prior Art

Siloxanes are polymeric compounds having repeating O—Si—O moieties or monomers which form a backbone, with a variety of substituents (e.g., alkyl groups) bonded to the Si atoms. A classic example of siloxanes are the polyorganicsiloxanes used as synthetic rubbers. These products have many advantages including thermal stability, the ability to repel water and form tight seals. They also have excellent resistance to oxygen, ozone and sunlight degradation, and exhibit good electrical insulative properties, low chemical reactivity and low toxicity.

Small and nanoscale metallic particles have been used as catalysts in the past. The small size of the metallic particles, apart from increasing the surface area, also renders the particles more active catalytically by exposing active sites on the metal surface to incoming reagents. Noble metals such as gold which are not active in their bulk state, can be good catalysts when their size is decreased to the nanometer level. Gold particles have been used as oxidation catalysts for toxic fumes such as CO and NO. Additionally, metallic nanoparticles such as gold, cobalt and iron have been shown to be good catalysts for preparing carbon and silicon nanotubes and other nanostructures.

However, prior use of metallic nanoparticles as catalysts has required rather high temperatures. For example, one high temperature process for the production of nanowires involves promotion of anisotropic crystal growth using metal particles as catalysts. This involves a vapor-liquid-solid (VLS) mechanism involving metal alloying, crystal nucleation and axial growth. This process requires very high reaction temperatures, and yields nanowires only of limited length.

Gold nanoparticles are known to be stabilized by a variety of ligands. It has been previously reported that nearly monodisperse gold nanoparticles can be prepared by carrying out a digestive ripening (refluxing a polydisperse colloid suspended in a solvent with a suitable capping agent) protocol with different ligands such as alkanethiols, phosphines, amines and silanes. Among these ligands it was clearly established by Banaszak Holl and coworkers that when silanes are attached to gold surfaces they lose hydrogen resulting in weak Au—Si covalent bonds. It has also been demonstrated that large amounts of gold and other metal colloids can be prepared in polar solvents such as acetone, butanone and pentanone. TEM pictures of the as-prepared colloids reveal that the gold nanoparticles are highly polydisperse and also highly defective in nature.

SUMMARY OF THE INVENTION

The present invention provides a new class of siloxanes having unique nanoscale structures heretofore unknown in the art. The new siloxanes are in the form of bodies having discrete, observable structures with at least one dimension thereof having the maximum value of up to about 200 nm. The bodies are usually elongated in nature, and are typically in the form of wires, tubes, filaments or coils. The siloxanes are made up of repeating O—Si—O moieties or monomers forming a backbone with substituents bonded to the Si atoms. The siloxane products of the invention can be used in many contexts where conventional siloxanes are commonly employed, such as in the formation of sealing products and products having high electrical resistivity. In addition, the siloxanes have excellent thermal insulative properties. The siloxanes may also be used as oxidation precursers in the production of nanoglass fibers, tubes and coils.

The invention also provides new methods for preparing the siloxanes in good yield and moderate reaction conditions. Broadly speaking, the methods involve preparing siloxanes wherein corresponding alkyl silanes are polymerized in an aqueous solvent system, and in the presence of an effective amount of a nanoparticle metallic catalyst.

DETAILED DESCRIPTION OF THE PREFERRED EMBODIMENT

1. Overall Synthesis of Siloxane Polymers

The synthesis of preferred solixane polymeric structures in accordance with the invention is illustrated in the following general reaction scheme

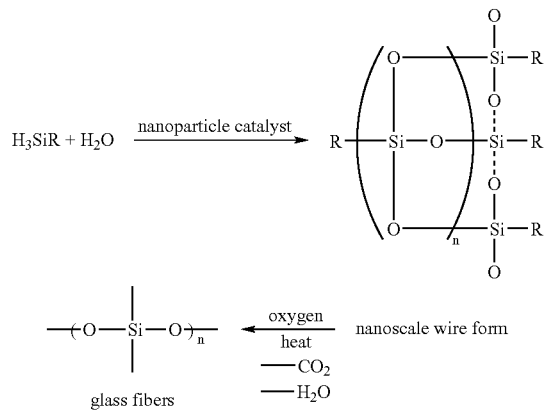

where R is a C2-C24 straight, branched chain or cyclic alkyl, alkenyl, alkynyl or aryl group and n is in excess of 1,000. The nanoparticle catalyst is preferably selected from the group consisting of gold and silver nanoparticles in a solvent system including water and a polar organic solvent.

More generally, the siloxanes of the invention may be prepared by first providing a substituted silane of the formula $R_xSiH_{4-x}$ wherein each R group is independently and respectively selected from the group consisting of C2-C24 straight, branched chain or cyclic alkyl, alkenyl, alkynyl or aryl groups. Normally, x would be 1 or 2 in the above formula. The substituted silane is then polymerized to the corresponding siloxane in a solvent system including water and a polar organic solvent, in the presence of a metallic nanoparticle catalyst.

The catalyst is preferably selected from the group consisting of nanoparticles of Au, Ag, Co, Ni, Pt, Ru, Cu, Fe, Pd, Rh and mixtures thereof, with the most preferred nanoparticles being those selected from the group consisting of Au and Ag and mixtures thereof. The nanoparticle catalysts useful in the invention should have a diameter of from about 2-100 nm, more preferably from about 5-75 nm, and most preferably from about 10-40 nm. The BET surface areas of the catalysts should be from about 5-75 m²/g, more preferably from about 10-50 m²/g, and most preferably from about 20-40 m²/g.

The catalysts are preferably prepared using a vaporization-co-condensation process sometimes referred to as the solvated metal atom dispersion (SMAD) method. The latter involves vaporization of metal under vacuum and co-deposition of the metal atoms with the vapors of a solvent on the walls of a reactor cooled to 77K (liquid nitrogen temperature). After warm-up, nanoparticles are stabilized both sterically (by solvation) and electrostatically (by incorporation of negative charge). The SMAD process was first disclosed in 1986 by Klabunde and co-workers, and is also described in U.S. Pat. No. 4,877,647, incorporated by reference herein.

In the case of the preferred gold and silver catalysts of the invention, the solvents employed are preferably ketones and especially those selected from the group consisting of ketones of the formula

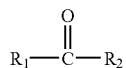

where $R_1$ and $R_2$ are independently and respectively selected from the group consisting of straight and branched chain C1-C5 alkyl and alkenyl groups, and the C1-C5 straight and branched chain alcohols. The most preferred solvents are acetone, butanone and pentanone. The solvent should be used at a level so that it is in molar excess relative to the atoms, and preferably a molar excess of from about 50-1000 should be established.

Figure 1:
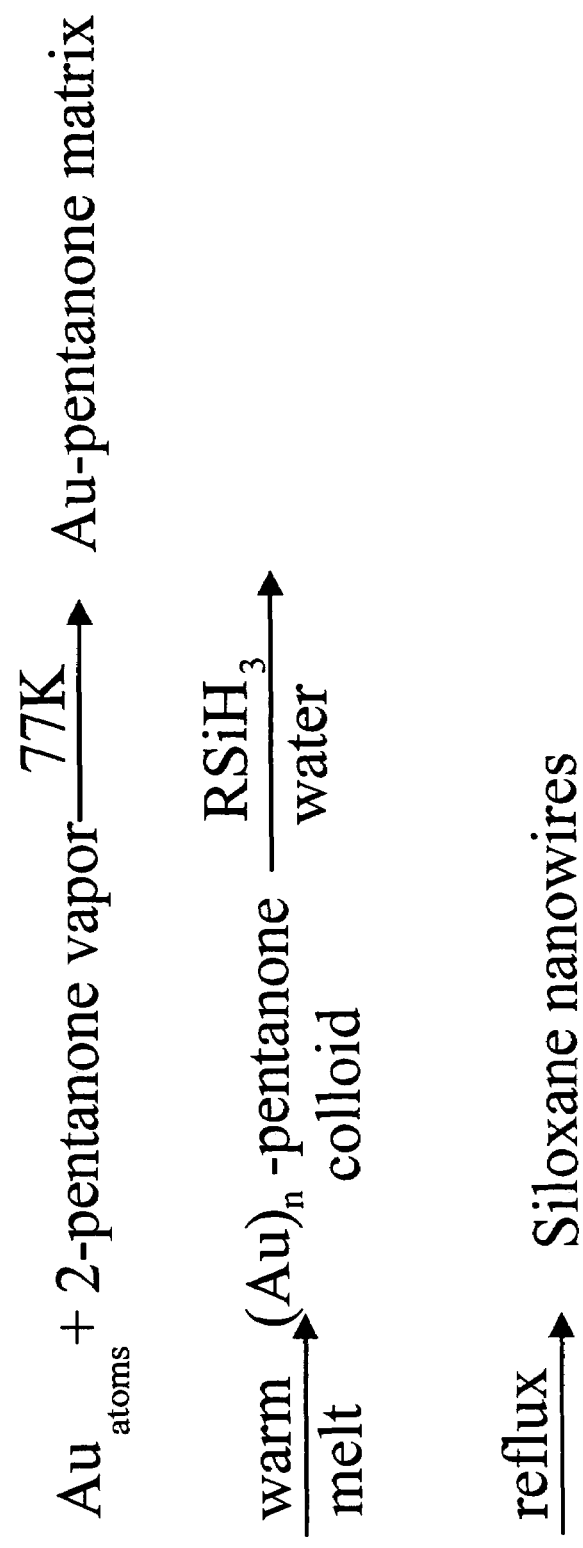
FIG. 1 is a flow diagram illustrating a particularly preferred synthesis for the preparation of siloxanes in accordance with the invention.

The most preferred technique for preparing the catalysts is described in U.S. Pat. No. 6,562,403 incorporated by reference herein but normally using only a single solvent. For reasons of efficiency, it is often preferred to prepare the catalyst using the SMAD process to obtain a nanoparticle-solvent colloid, followed by addition of substituted silane and water with heating and refluxing to obtain the desired final product. Such a stepwise synthetic scheme is illustrated in FIG. 1.

The polar organic component of the solvent system is most preferably selected from the group consisting of ketones, alcohols and mixtures thereof. When a ketone is employed, it is advantageously of the formula $R_1(CO)R_2$ wherein $R_1$ and $R_2$ are independently and respectively selected from the group consisting of straight and branched chain C1-C5 alkyl and alkenyl groups. Especially preferred ketones are selected from the group consisting of acetone, butanone, pentanone and mixtures thereof. If an alcohol is used, the alcohol is preferably selected from the group consisting of C1-C5 straight and branched chain alcohols. Whatever polar organic solvent or mixture thereof is used, it should be present in a molar excess relative to the substituted silane, and typically from about 50-1,000.

The polymerization reaction is normally carried out for a period of from about 30 minutes-24 hr, more preferably from about 1-4 hr. Broadly speaking, the reaction may be carried out at a temperature of from about 25-200° C., more preferably from about 75-150° C., and most preferably from about 100-140° C. During heating, the reaction mixture is preferably refluxed, but this is not essential. The reaction may be carried out under an inert atmosphere, e.g., argon. Pressures are normally at or about atmospheric.

The final siloxane product should be in the form of discrete, observable structures with at least one dimension thereof up to about 200 nm; this dimension is typically the diameter of the final structure. These structures are normally selected from the group consisting of elongated wires, tubes, filaments, coils and mixtures thereof, and can be observed by conventional scanning electron microscope (SEM) or transmission electron microscope (TEM) techniques at magnification levels of from 500×-3,000×.

More preferably, the elongated polymer bodies should have a length of at least about 100 nm, and more preferably from about 10 microns up to about 10 mm or more. For example, siloxane bodies of virtually unlimited length may be producible by the continuos or stepwise introduction of silanes during the course of the synthesis, versus introduction for only a single quantity of silanes at the outset of the reaction. The diameter of the bodies should be from about 2-200 nm, more preferably from about 10-100 nm, and most preferably from about 20-60 nm.

Figure 2:
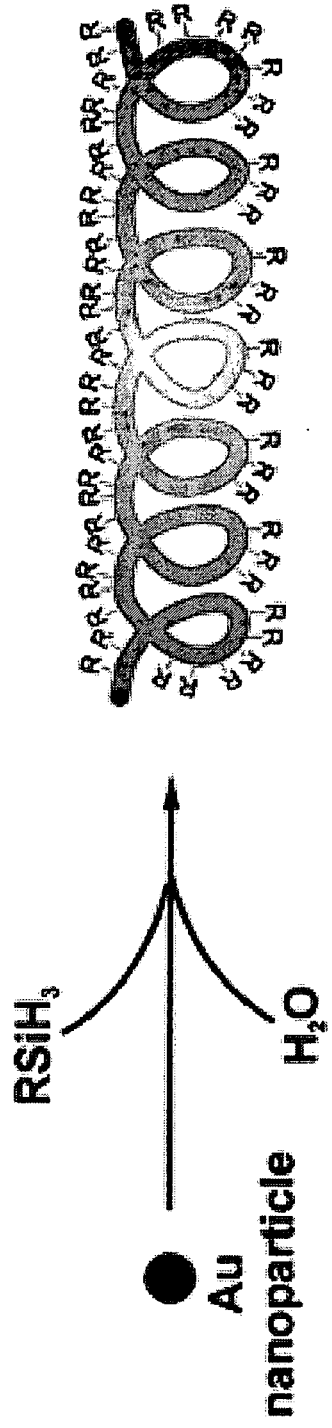
FIG. 2 is a schematic representation of a probable reaction mechanism for the production of siloxanes in accordance with the invention.
Figure 3:
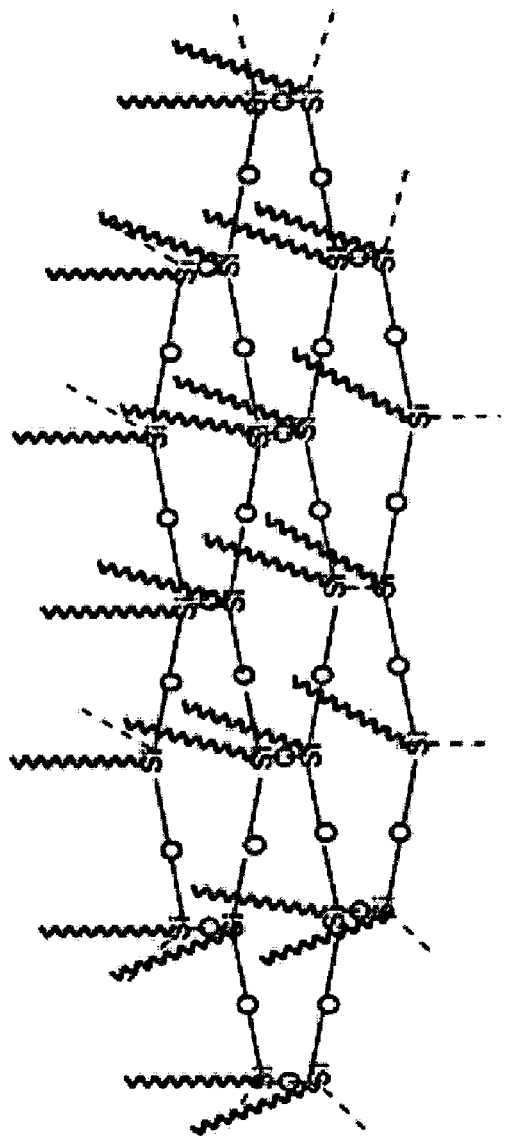
FIG. 3 is a schematic depiction of a probable structure of siloxanes in accordance with the invention.

Although not wishing to be bound by any theory, it is postulated that the polymerization reaction proceeds as schematically depicted in FIG. 2. Specifically, the first step involved in attachment of a metallic catalyst nanoparticle to the surface of a substituted silane resulting in the formation of metal-Si bonds. These weak covalent metal-Si bonds are then attacked by water molecules, leading to the formation of corresponding hydroxides. These hydroxide molecules are then polymerized. FIG. 3 is a schematic depiction of a siloxane in accordance with the invention, illustrating the O—Si—O backbone with substituents (not shown) bonded to the Si atoms (the substituents are randomly tilted to give a better view).

2. Example

In a typical reaction, 300 mg of $C_{18}H_{37}SiH_3$ was added to 3 ml of Au colloid in butanone or 2-pentanone prepared using the SMAD process and containing approximately 12 mg of Au (Au:silane ligand molar ratio approximately 1:20). Ten µL of water was added to the gold colloid itself before adding the silane. The mixture was then allowed to reflux under argon atmosphere for 90 minutes.

The silane polymers may be recovered by simple decantation of solvent followed by vacuum drying. Other methods of separation can also be employed, e.g., air or nitrogen may be blown over the reaction mixture, so long as the desirable properties of the siloxane polymers are retained.

3. Properties of Siloxane Polymers

Figure 4:
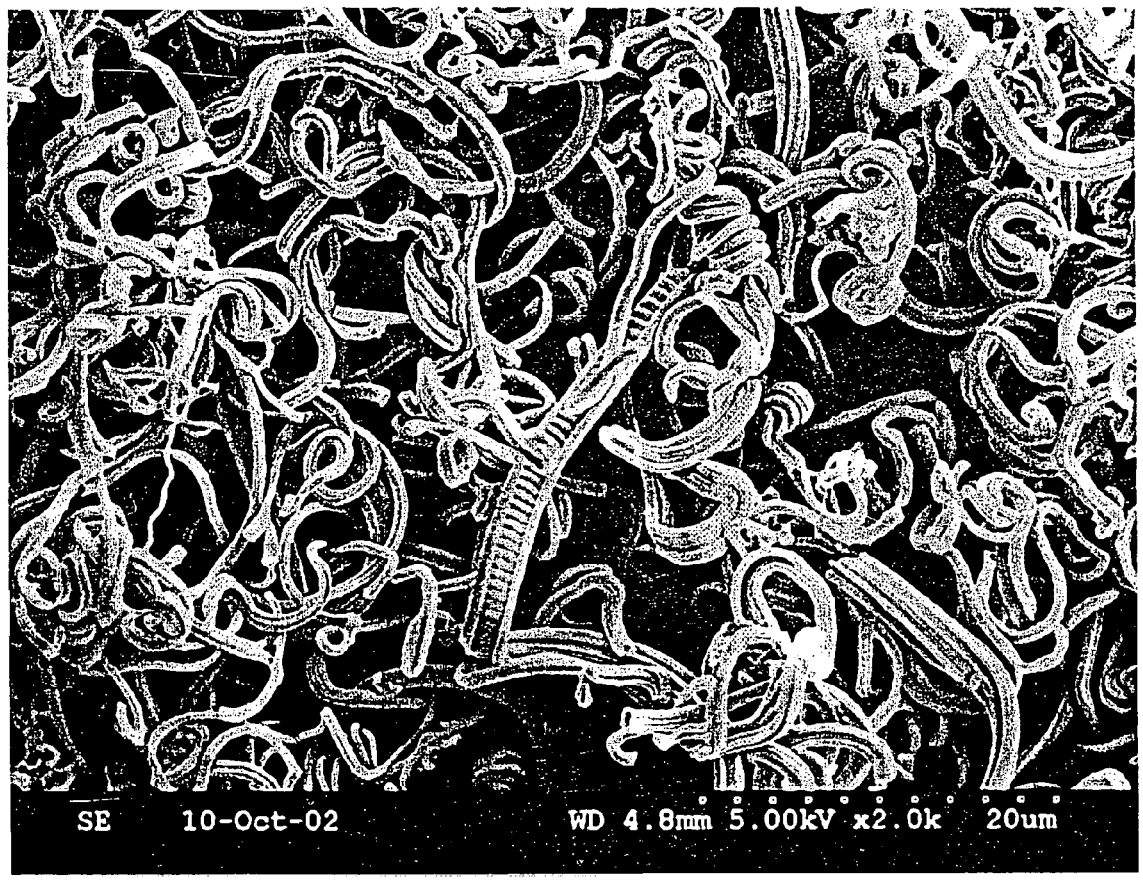
FIG. 4 is an SEM photograph depicting siloxane nanowires, filaments and tubes resulting from the reflux reaction of Au-pentanone colloid with $C_{18}H_{37}SiH_3$ in the presence of water.
Figure 5:
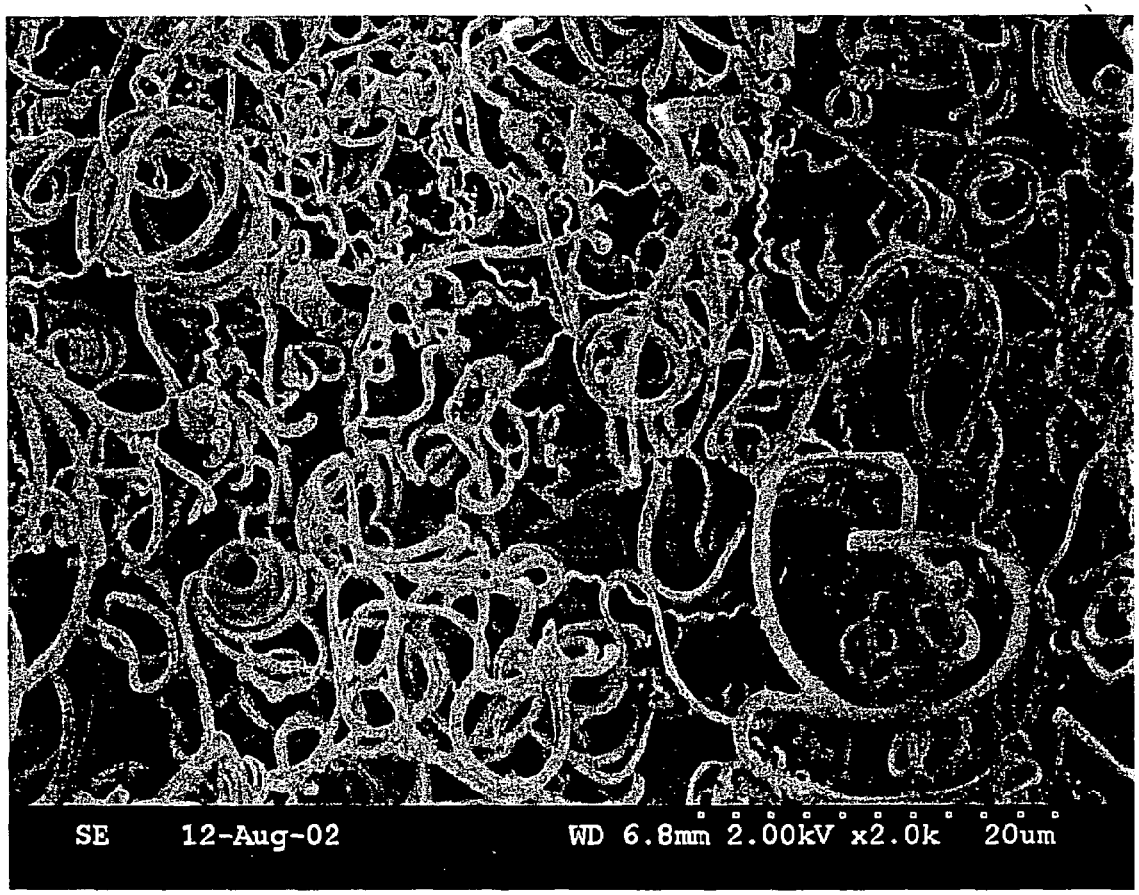
FIG. 5 is a 2000×SEM photograph illustrating exemplary siloxanes of the invention.
Figure 6:
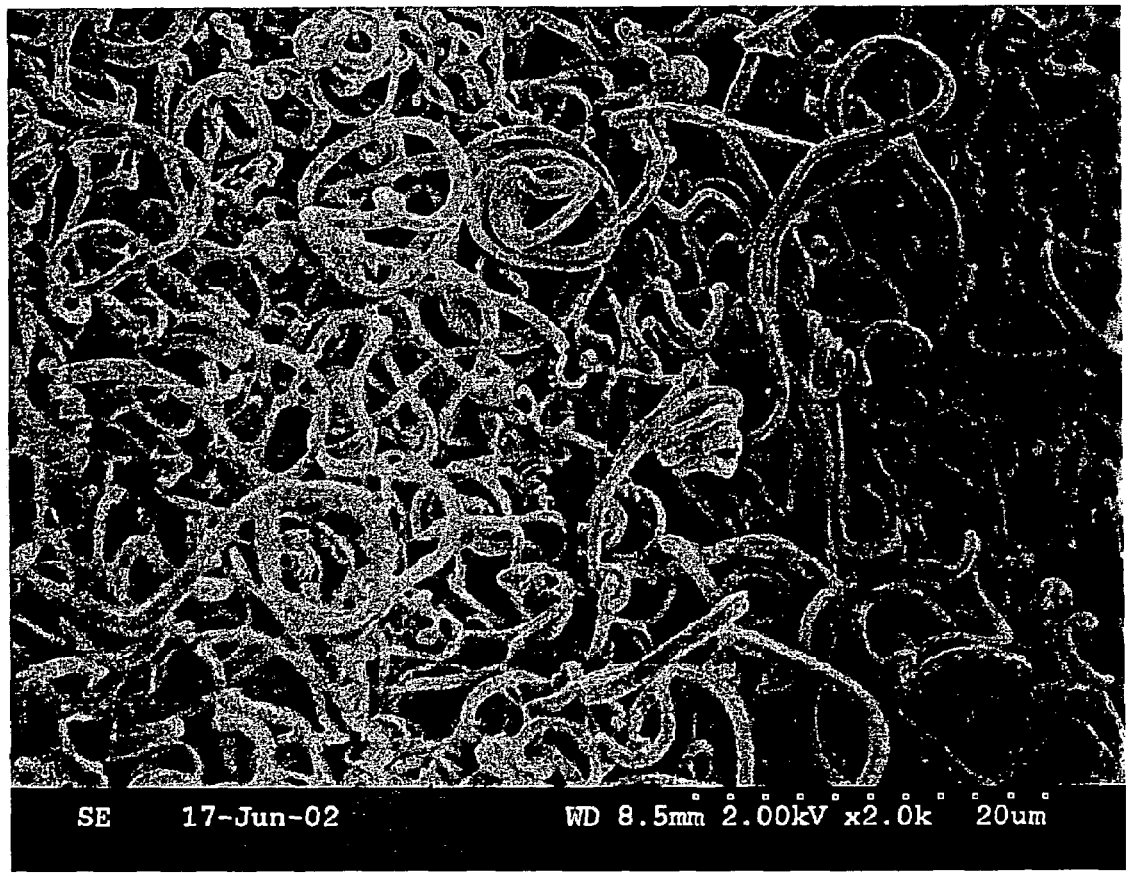
FIG. 6 is a 2000×SEM photograph illustrating other exemplary siloxanes of the invention.
Figure 7:
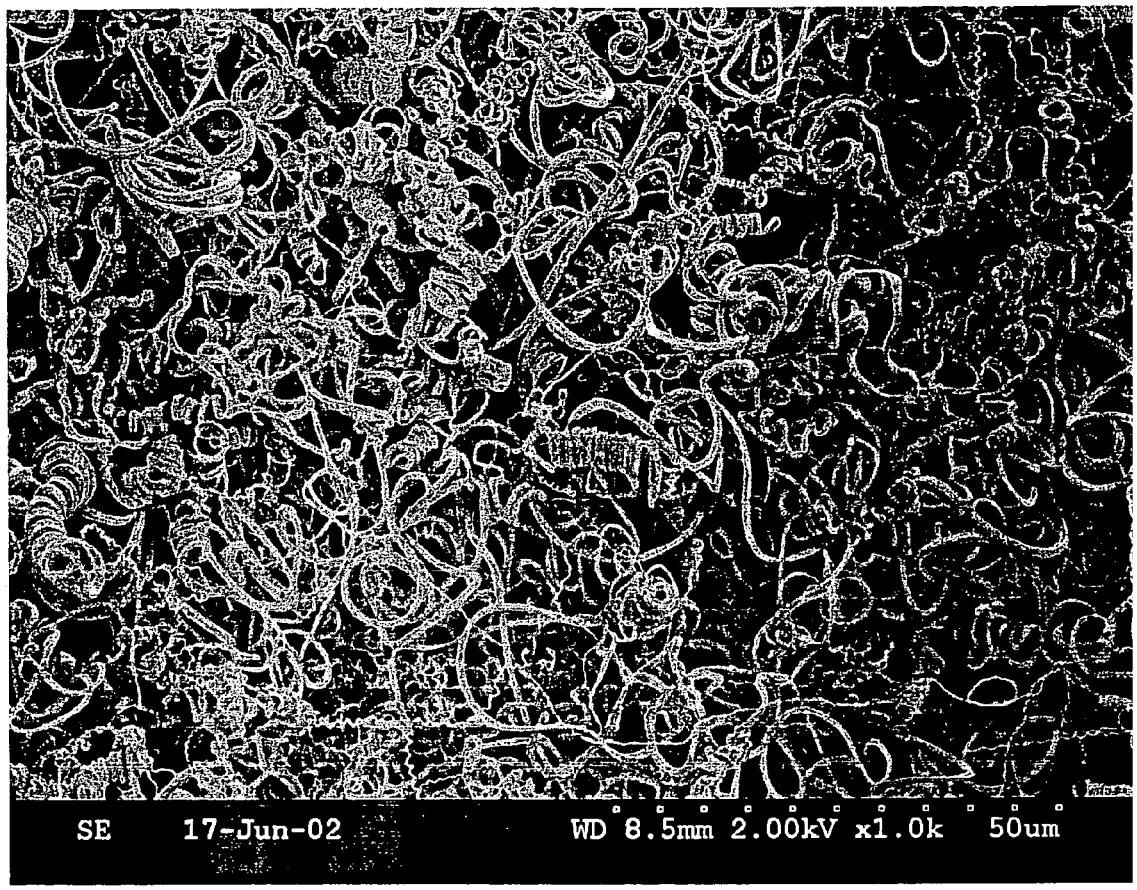
FIG. 7 is a 1000×SEM photograph illustrating other exemplary siloxanes of the invention.
Figure 8:
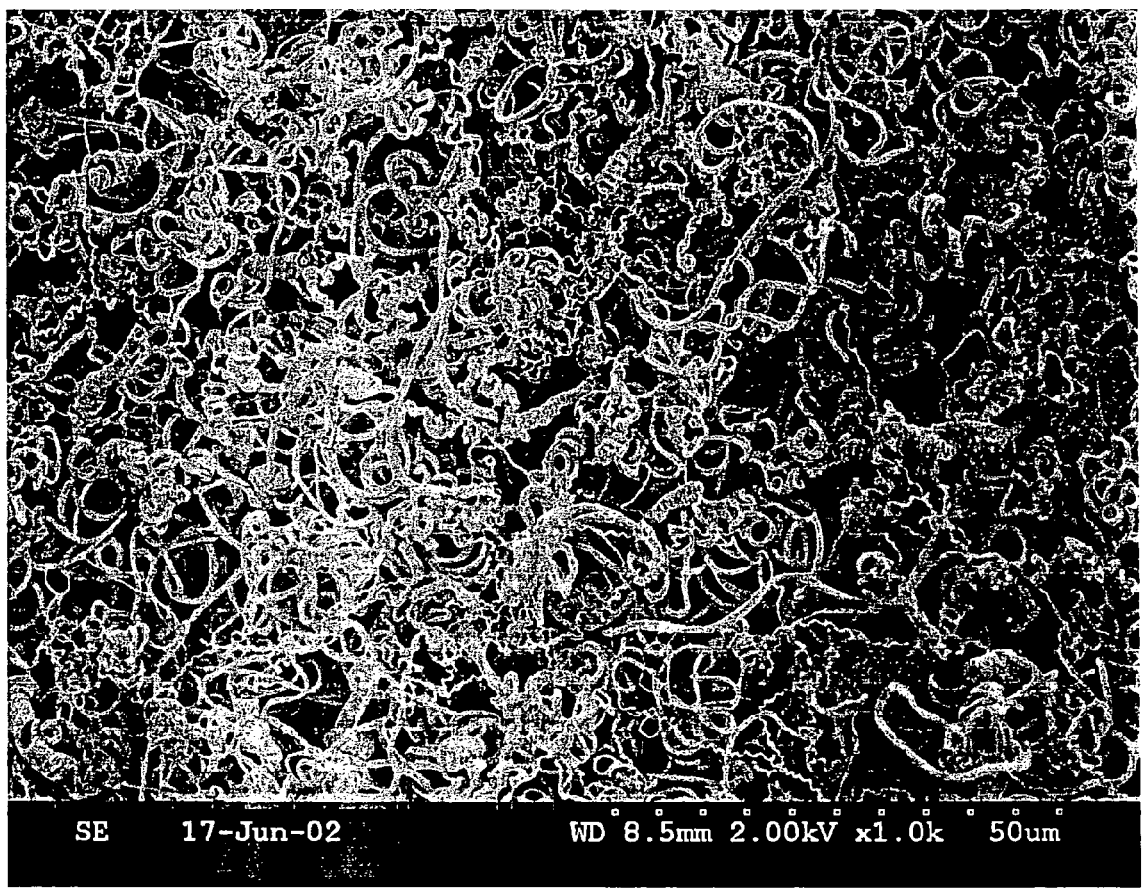
FIG. 8 is a 1000×SEM photograph illustrating other exemplary siloxanes of the invention.

The melting points of the polymers range from about 60-90° C. As recovered, the polymers are in the form of bodies such as the elongated nanowires shown in FIG. 4. Additional illustrations of the polymeric structures of the siloxanes of the invention are illustrated in FIGS. 5-8, which are SEM photographs at 2000×(FIGS. 5 and 6) and 1000× (FIGS. 7 and 8). The polymeric structures have the typical length and diameters described previously.

Figure 9:
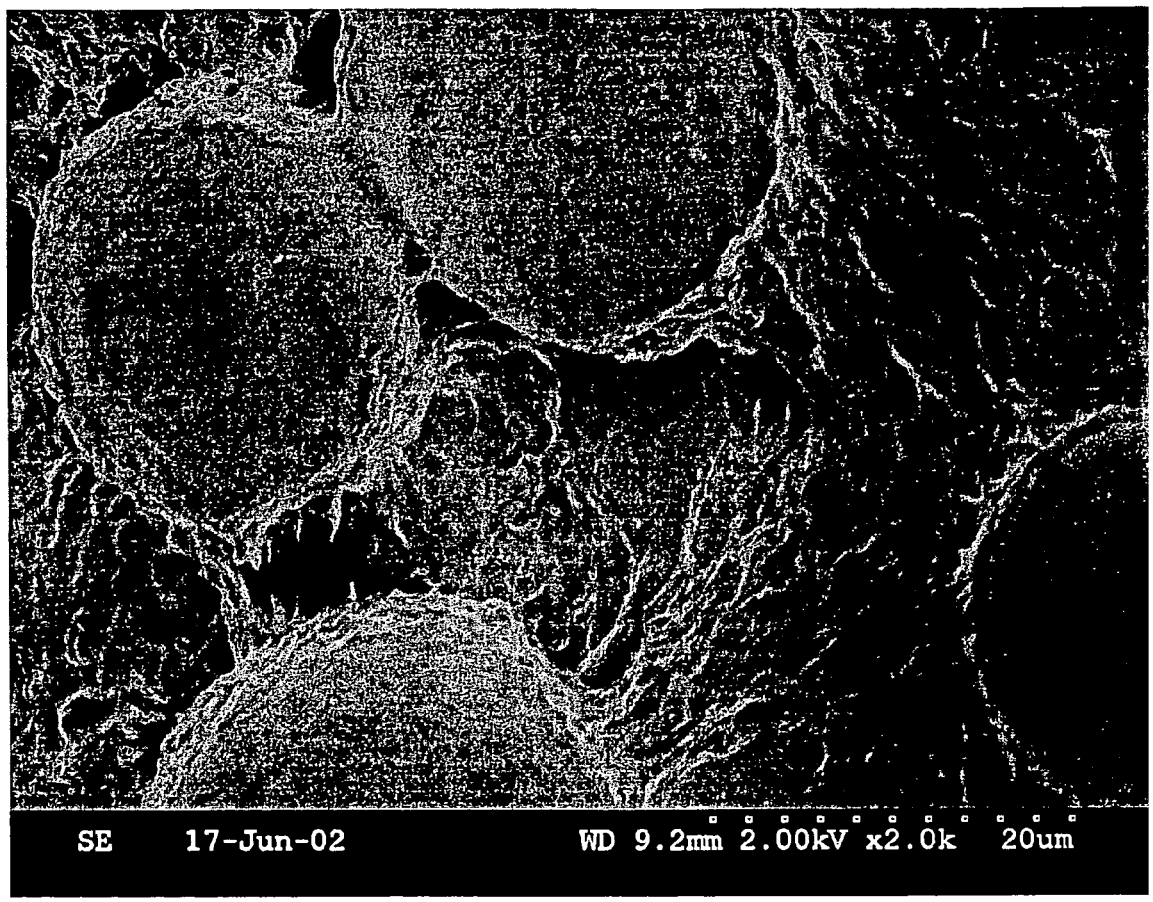
FIG. 9 is a 2000×SEM photograph illustrating siloxanes of the invention, after allowing the siloxanes to dry on a hydophilic mica surface.
Figure 10:
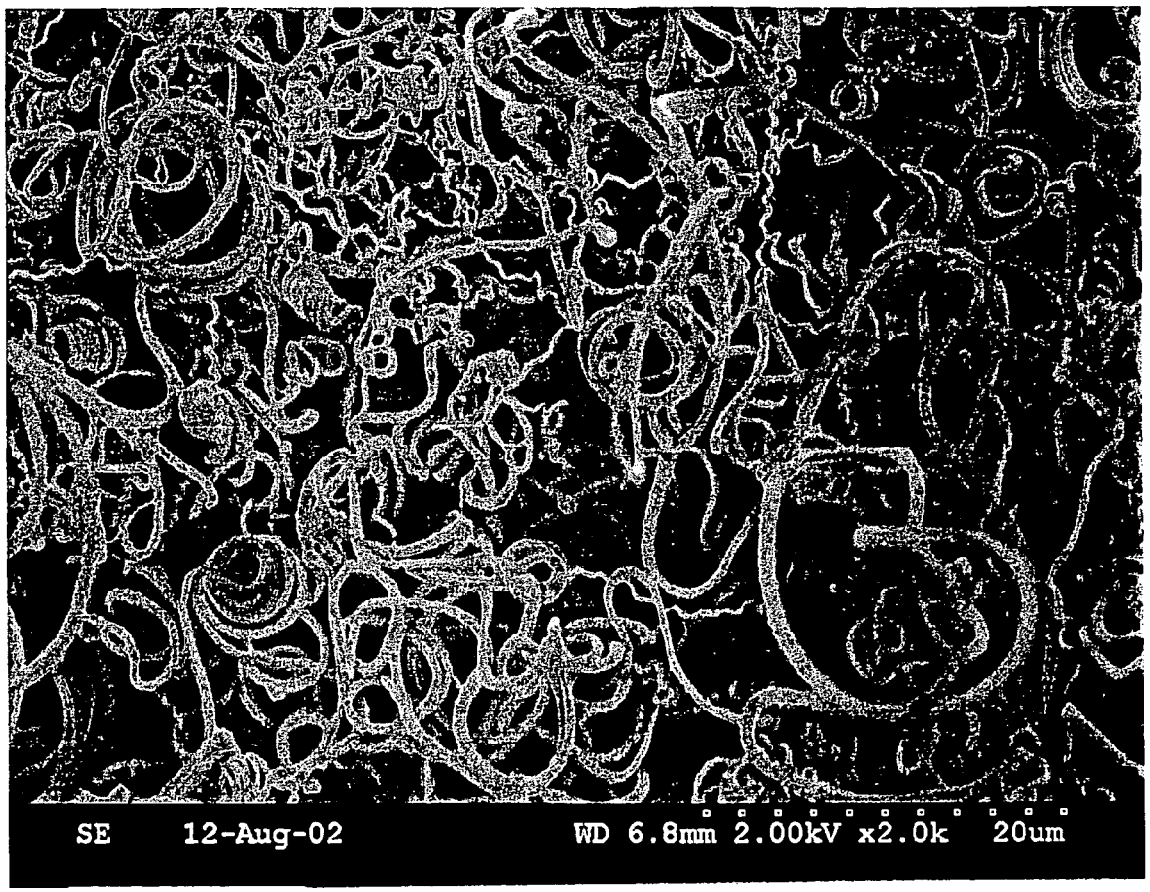
FIG. 10 is a 2000×SEM photograph illustrating the siloxanes of the invention, after drying of the siloxanes on hydrophobic carbon coated glass.
Figure 11:
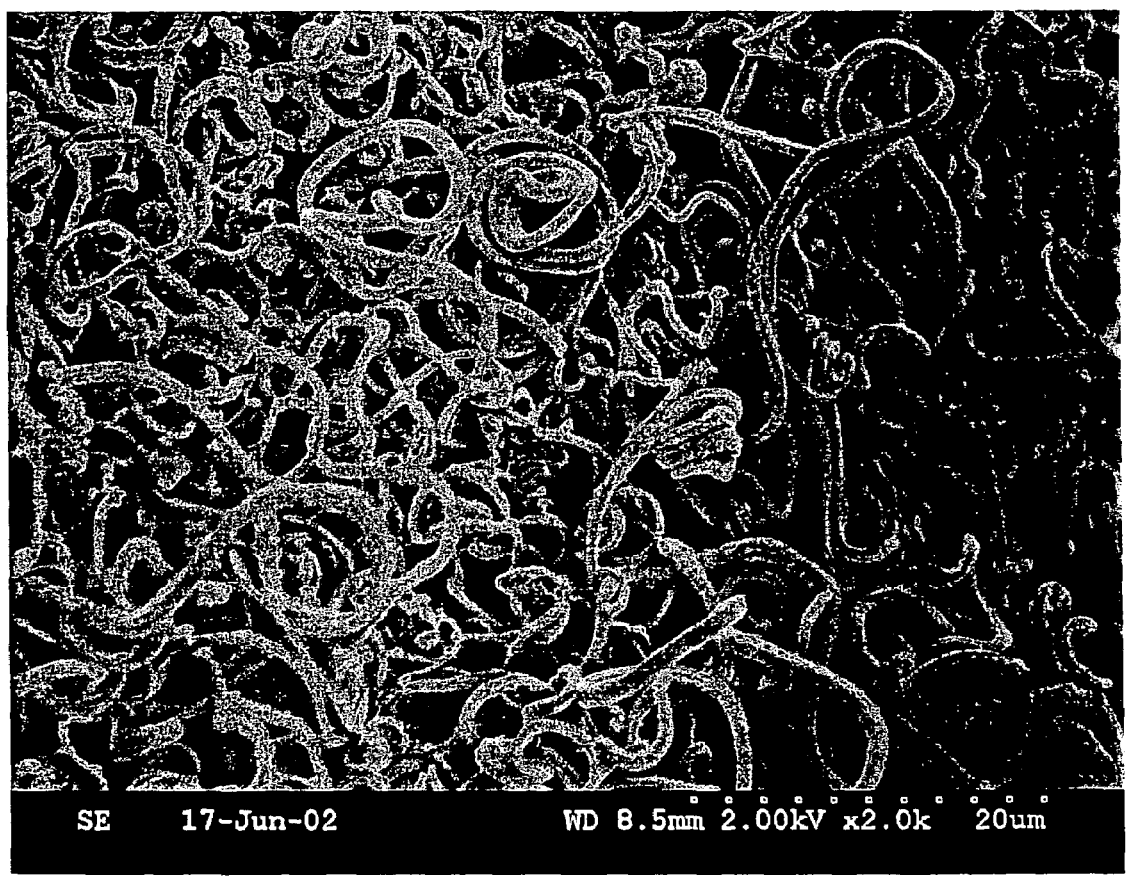
FIG. 11 is a 2000×SEM photograph illustrating the siloxanes of the invention, after deposition on highly oriented polished graphite (HOPG)
Figure 12:
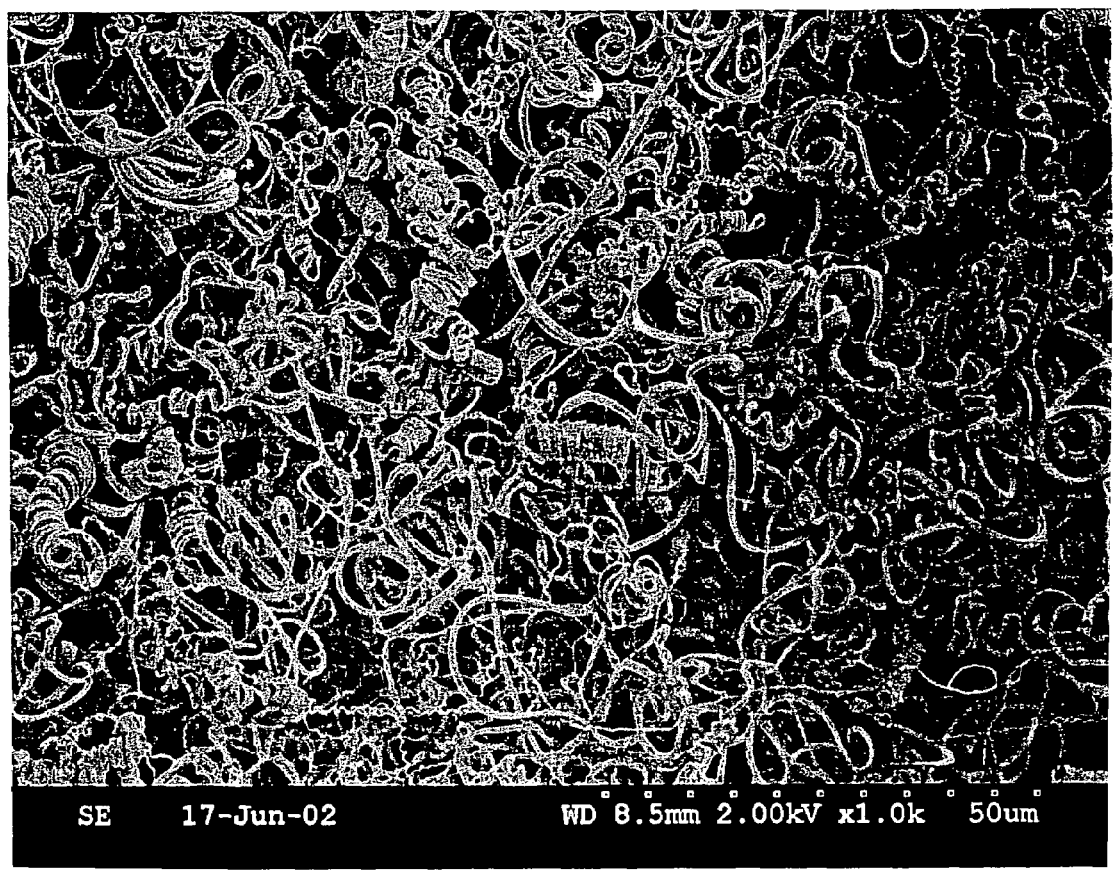
FIG. 12 is a 2000×SEM photograph illustrating siloxanes of the invention, after deposition on glass derivitized with octyl groups.
Figure 13:
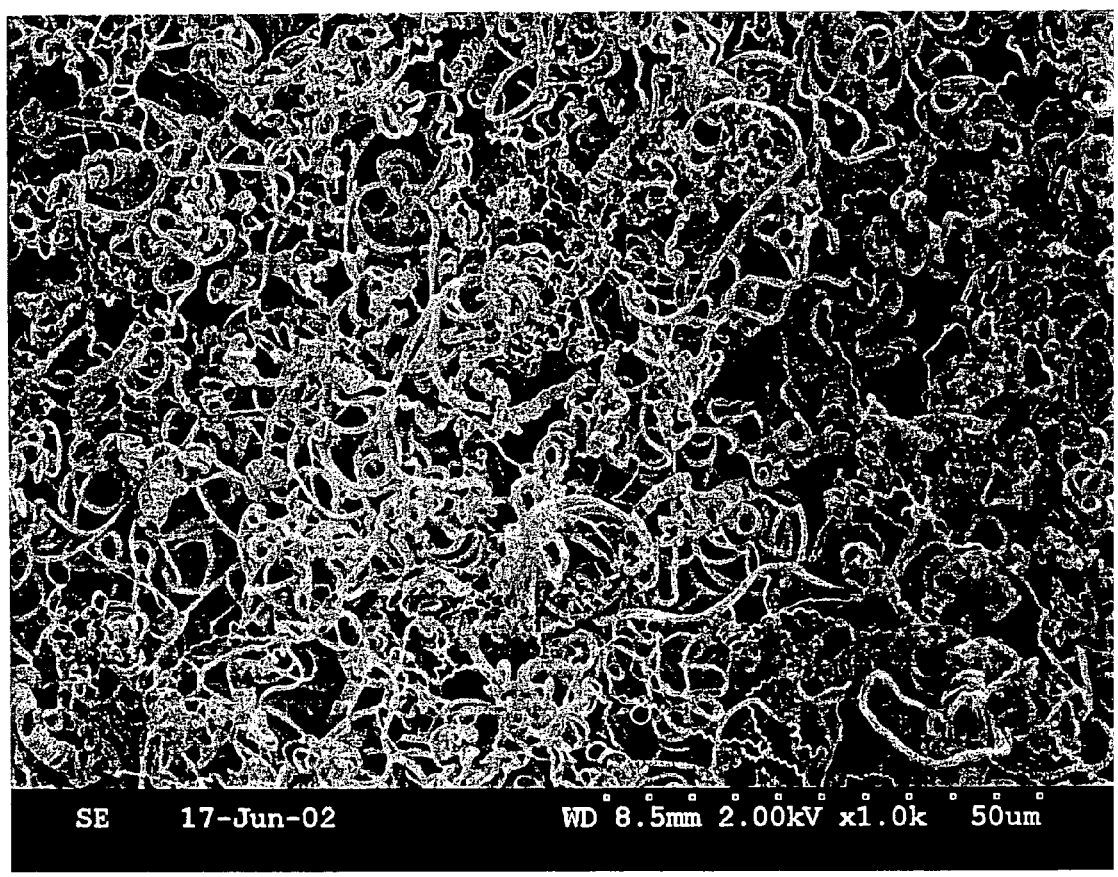
FIG. 13 is a 1000×SEM photograph illustrating siloxanes of the invention, after deposition on glass derivitized with thiol groups.

It has also been found that the siloxane polymers of the invention may change in character upon deposition of the polymers on hydrophilic surfaces. For example, FIG. 9 depicts a 2000× SEM of the same nanoparticles illustrated in FIGS. 5-8, but after a solution containing the nanowires was allowed to dry on a hydrophilic mica surface. This treatment caused the polymers to lose their wire-like morphology and become more amorphous. However, this phenomenon is not observed when a similar process is carried out using hydrophobic surfaces. Thus, FIG. 10 is a 2000×SEM which illustrates the nanowires deposited on carbon coated glass, and whereas FIG. 11 is a similar SEM where the nanowires were deposited on highly oriented polished graphite (HOPG). FIG. 12 is a similar 2000×SEM, but shows the effect of deposition of the nanowires on glass derivatized with octyl groups. FIG. 13 is a 1000×SEM showing the nanowires deposited on glass derivatized with thiol groups. This same characteristic is maintained when the nanowires are deposited on carbon coated supports or a TEM grid.

Figure 14:
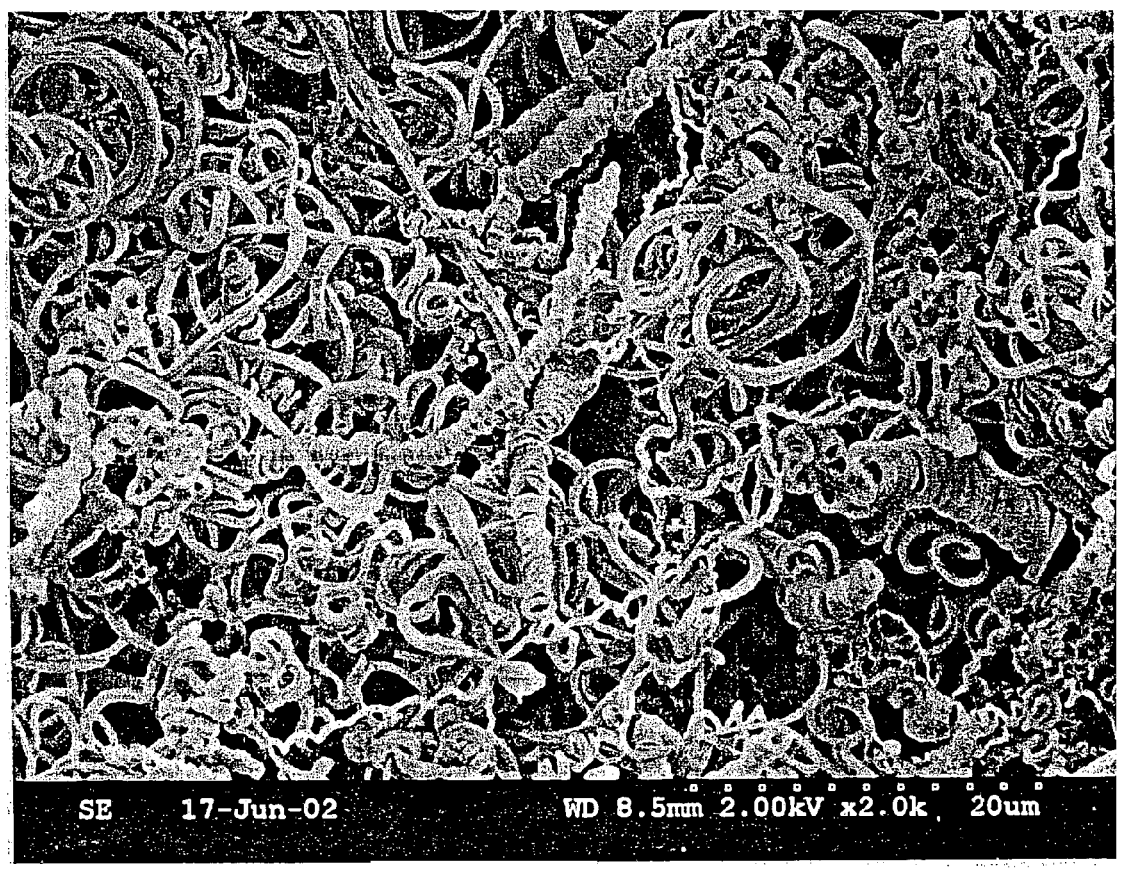
FIG. 14 is a SEM photograph of exemplary siloxanes in accordance with the invention, depicting the presence of significant helical nanostructures.

The preferred siloxane polymers also exhibit a significant helicity as can be seen from an examination of the SEM photographs (FIGS. 5-8 and 10-13). This coiling is also evident from a consideration of FIG. 14.

Figure 15:
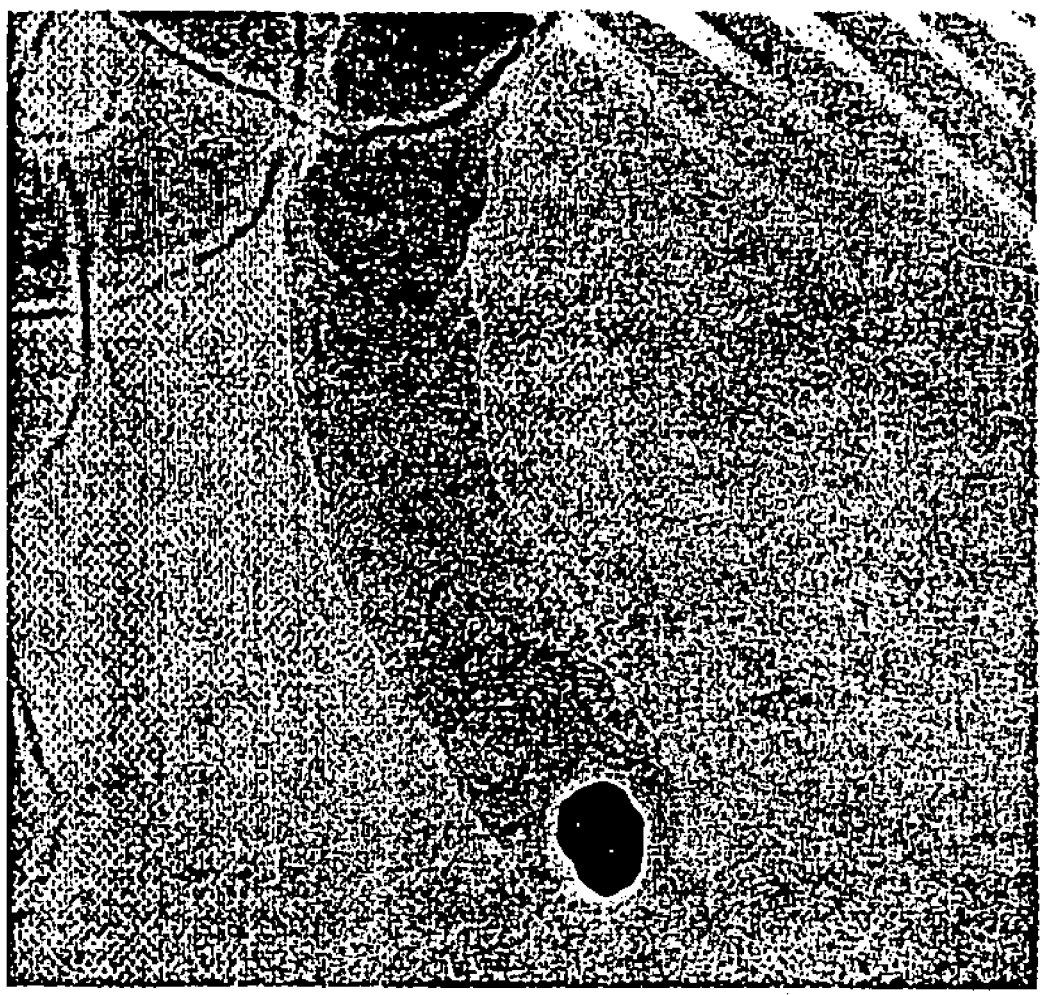
FIG. 15 is a high resolution Transmission Electron Microscope (TEM) photograph depicting a gold nanoparticle at the tip of a nanowire.

It has also been observed that the nanoparticle catalysts effectively serve as templates, restricting the polymeric structures as they form to create the elongation in the final polymeric body. This can be seen in the high resolution TEM photograph of FIG. 15, where a gold nanoparticle catalyst particle is attached to the end of one of the elongated bodies.

We claim:

1. In a method of preparing siloxanes wherein a substituted silane is polymerized in an solvent system comprising water, the improvement which comprises carrying out said polymerization in the presence of an effective amount of a nanoparticle metallic catalyst.

2. The method of claim 1, said catalyst selected from a group consisting of nanoparticles of Au, Ag, Co, Ni, Pt, Ru, Cu, Fe, Pd, Rh and mixtures thereof.

3. The method of claim 2, said catalyst comprising nanoparticles selected from the group consisting of Au and Ag and mixtures thereof.

4. The method of claim 1, said nanoparticles having a diameter of from about 2-100 nm.

5. The method of claim 4, said diameter being from about 5-75 nm.

6. The method of claim 5, said diameter being from about 10-40 nm.

7. The method of claim 1, said catalyst having a surface area of from about 5-75 $m^2/g$.

8. The method of claim 7, said surface area being from about 10-50 $m^2/g$.

9. The method of claim 8, said surface area being from about 20-40 $m^2/g$.

10. The method of claim 1, said polymerization reaction being carried out in a solvent system including a polar organic solvent.

11. The method of claim 10, said polar organic solvent selected from the group consisting of ketones, alcohols and mixtures thereof.

12. The method of claim 11, said polar organic solvent comprising ketones of the formula $R_1(CO)R_2$ wherein $R_1$ and $R_2$ are independently and respectively selected from the group consisting of straight and branched chain C1-C5 alkyl and alkenyl groups.

13. The method of claim 12, said polar organic solvent selected from the group consisting of acetone, butanone, pentanone and mixtures thereof.

14. The method of claim 10, said polar organic solvent selected from the group consisting of C1-C5 straight and branched chain alcohols.

15. The method of claim 10, said polar organic solvent being present in a molar excess relative to said substituted silane.

16. The method of claim 15, said molar excess being from about 50-1,000.

17. The method of claim 1, including the step of heating said system for a period of from about 30 minutes-24 hr.

18. The method of claim 17, said period being from about 1-4 hr.

19. The method of claim 1, including the step of carrying out said polymerization at a temperature of from about 25-200° C.

20. The method of claim 19, said temperature being from about 75-150° C.

21. The method of claim 20, said temperature being from about 100-140° C.

22. The method of claim 1, said polymerization reaction being carried out so as to obtain siloxane polymer bodies having discrete, observable structures with at least one dimension of up to about 200 nm.

23. The method of claim 22, said structures selected from the group consisting of elongated wires, tubes, filaments, coils and mixtures thereof.

24. The method of claim 22, said body having a length of at least about 100 nm.

25. The method of claim 24, said length being at least about 10 microns.

26. The method of claim 22, said bodies having a diameter of from about 2-200 nm.

27. The method of claim 26, said diameter being from about 10-100 nm.

28. The method of claim 27, said diameter being from about 20-60 nm.

29. The method of claim 22, said substituted silane being an alkylsilane.

30. A method of polymerizing a substituted silane comprising the steps of:
providing a substituted silane of the formula $R_xSiH_{4-x}$ wherein each R group is independently and respectively selected from the group consisting of C2-C24 straight, branched chain or cyclic alkyl, alkenyl, alkynyl or aryl groups; and
polymerizing said substituted silane to form a siloxane in a solvent system comprising water and a polar organic solvent, and in the presence of a metallic nanoparticle catalyst.

31. The method of claim 30, said catalyst selected from a group consisting of nanoparticles of Au, Ag, Co, Ni, Pt, Ru, Cu, Fe, Pd, Rh and mixtures thereof.

32. The method of claim 31, said catalyst comprising nanoparticles selected from the group consisting of Au and Ag and mixtures thereof.

33. The method of claim 30, said catalyst having a diameter of from about 2-100 nm.

34. The method of claim 33, said diameter being from about 5-75 nm.

35. The method of claim 34, said diameter being from about 10-40 nm.

36. The method of claim 30, said catalyst having a surface area of from about 5-75 $m^2/g$.

37. The method of claim 36, said surface area being from about 10-50 $m^2/g$.

38. The method of claim 37, said surface area being from about 20-40 $m^2/g$.

39. The method of claim 30, said polar organic solvent selected from the group consisting of ketones, alcohols and mixtures thereof.

40. The method of claim 39, said polar organic solvent comprising ketones of the formula $R_1(CO)R_2$ wherein $R_1$ and $R_2$ are independently and respectively selected from the group consisting of straight and branched chain C1-C5 alkyl and alkenyl groups.

41. The method of claim 40, said polar organic solvent selected from the group consisting of acetone, butanone, pentanone and mixtures thereof.

42. The method of claim 30, said polar organic solvent selected from the group consisting of C1-C5 straight and branched chain alcohols.

43. The method of claim 30, said polar organic solvent being present in a molar excess relative to said substituted silane.

44. The method of claim 43, said molar excess being from about 50-1,000.

45. The method of claim 30, including the step of heating said system for a period of from about 30 minutes-24 hr.

46. The method of claim 45, said period being from about 1-4 hr.

47. The method of claim 30, including the step of carrying out said polymerization at a temperature of from about 25-200° C.

48. The method of claim 47, said temperature being from about 75-150° C.

49. The method of claim 48, said temperature being from about 100-140° C.

50. The method of claim 30, said polymerization reaction being carried out so as to obtain siloxane polymer bodies having discrete, observable structures with at least one dimension of up to about 200 nm.

51. The method of claim 50, said structure selected from the group consisting of elongated wires, tubes, filaments, coils and mixtures thereof.

52. The method of claim 50, said bodies, in addition to said at least one dimension having a maximum of up to about 200 nm, having a length of at least about 100 nm.

53. The method of claim 52, said length being from about 10 microns up to about 1 nm.

54. The method of claim 50, said bodies having a diameter of from about 2-200 nm.

55. The method of claim 54, said diameter being from about 10-100 nm.

56. The method of claim 55, said diameter being from about 20-60 nm.

57. The method of claim 30, said polymer bodies comprising repeating (—O—Si—O—) moieties or monomers.

* * * * *